(12) United States Patent
Kim et al.

(10) Patent No.: US 6,860,240 B2
(45) Date of Patent: *Mar. 1, 2005

(54) METHOD FOR PET TRAINING DEVICE

(75) Inventors: Joon S. Kim, Dallas, TX (US); Gi Hyun Lee, Incheon (KR); Dong Joo Lee, Seoul (KR)

(73) Assignee: D. T. Systems, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/207,942

(22) Filed: Jul. 30, 2002

(65) Prior Publication Data

US 2003/0116099 A1 Jun. 26, 2003

(51) Int. Cl.[7] ............................................. A01K 15/00
(52) U.S. Cl. ..................... 119/719; 119/718; 119/720; 119/905; 119/908; 340/573.1
(58) Field of Search ................................ 119/719, 718, 119/712, 720, 905, 908, 856, 859, 862; 340/573.1, 573.3

(56) References Cited

U.S. PATENT DOCUMENTS

| | | | | |
|---|---|---|---|---|
| 3,823,691 A | * | 7/1974 | Morgan | 119/718 |
| 4,180,013 A | * | 12/1979 | Smith | 119/718 |
| 4,335,682 A | * | 6/1982 | Gonda et al. | 119/719 |
| 4,881,148 A | * | 11/1989 | Lambropoulos et al. | 361/172 |
| 4,887,549 A | * | 12/1989 | Powell | 119/718 |
| 4,956,795 A | * | 9/1990 | Yamaguchi et al. | 702/99 |
| 5,041,969 A | * | 8/1991 | Kawasaki et al. | 712/234 |
| 5,109,221 A | * | 4/1992 | Lambropoulos et al. | 340/5.22 |
| 5,353,744 A | * | 10/1994 | Custer | 119/719 |
| 5,465,687 A | * | 11/1995 | Custer | 119/719 |
| 5,559,498 A | * | 9/1996 | Westrick et al. | 340/573.3 |
| 5,601,054 A | * | 2/1997 | So | 119/718 |
| 5,605,116 A | * | 2/1997 | Kim et al. | 119/720 |
| 5,666,908 A | * | 9/1997 | So | 119/720 |
| 5,749,324 A | * | 5/1998 | Moore | 119/719 |
| 5,769,032 A | * | 6/1998 | Yarnall et al. | 119/721 |
| 5,815,077 A | * | 9/1998 | Christiansen | 340/573.3 |
| 5,913,284 A | * | 6/1999 | Van Curen et al. | 119/720 |
| 6,005,508 A | * | 12/1999 | Tsui | 341/173 |
| 6,019,066 A | * | 2/2000 | Taylor | 119/720 |
| 6,079,367 A | * | 6/2000 | Stapelfeld et al. | 119/720 |
| 6,131,535 A | * | 10/2000 | So | 119/719 |
| 6,135,060 A | * | 10/2000 | So | 119/720 |
| 6,167,843 B1 | * | 1/2001 | Kim | 119/720 |
| 6,474,269 B2 | * | 11/2002 | So | 119/720 |
| 6,598,563 B2 | * | 7/2003 | Kim et al. | 119/720 |

* cited by examiner

*Primary Examiner*—Yvonne R. Abbott
(74) *Attorney, Agent, or Firm*—James A. Harrison

(57) ABSTRACT

The pet training device comprises a handheld wireless command module, a wireless receiver module connected to an adjustable collar assembly. The wireless command module is used to select a stimulation mode, stimulation duration, and a stimulation intensity level through the used of one-touch digital switches located on the device front panel. The selected functions are displayed on a LCD. The stimulation commands are transmitted to the wireless receiver module where they are demodulated into control signals that trigger a shock, a vibration, or both. When the wireless receiver is placed in the no-bark mode, the wireless receiver module will generate a shock when triggered by a bark sensor. Power controllers built into both the wireless command module and wireless receiver module optimizes battery life by turning the devices off after a period of inactivity.

33 Claims, 16 Drawing Sheets

Wireless command module

Wireless command module

Wireless receiver module attached to collar

Wireless command module

Transmission Message

Wireless receiver module

LCD Display

Wireless Command Module

Wireless Command Module

Wireless Receiver Module

Wireless Receiver Module

Shock Module 316

Vibrate Module 320

No-bark Module 324

Sealing belt

Receiver Module Method Flow Chart

Receiver Module Method Flow Chart

Transmitter Module Method Flow Chart

METHOD FOR PET TRAINING DEVICE

CROSS-REFERENCE TO RELATED APPLICATIONS

This application claims priority to and incorporates by reference the Foreign Patent Application having a translated title of, "Apparatus for Animal Training and for the Prevention of Barking", by the inventors Joon Soo Kim, Ki H. Lee, and Dong J. Lee, having an application number of PATENT-2001-0082740 and a filing date of Dec. 21, 2001.

BACKGROUND OF THE INVENTION

1. Technical Field of the Invention

This invention relates generally to an apparatus and a method for animal behavior modification and, more particularly, to an apparatus and a method for animal training and for the prevention of barking.

2. Description of the Related Art

Animals exhibiting undesirable behavior, such as barking excessively and damaging possessions, typically require behavior modification. Undesirable behavior such as excessive barking is not only irritating to family and neighbors but, in some municipalities, is a violation of city ordinance punishable by fines or removal of the offending animal. Disobedient dogs, for example, present a wide range of potential problems both legal and financial. It is desirable, therefore, to train the offending animal by modifying the undesirable behavior.

Typical training includes remote electrical stimulation during the undesirable behavior in order to discourage the animal. Electrical stimulation can be a shock, a vibration, or a combination of both, usually accomplished by attaching a shock and vibration device to the animal by way of a collar. The electrical stimulation can be set to a low level then increased until the behavior modification is accomplished. Conventional training devices use a transmitter with analog controls to set a stimulation mode and level then send the stimulation information via a radio wave to a receiver. The receiver converts the radio waves into signals that will activate the shock and vibration devices.

A number of problems exist with analog controls. The first problem is that the analog controls are difficult to set accurately. A second problem with analog controls is that, once set, the setting can be too easily changed by accidentally touching the control. A third problem with analog controls is that they are typically "power hungry" devices, meaning they consume a great deal of power. This is a considerable problem with battery-operated devices. A significant problem with conventional training devices is the absence of a display to provide information to the user. The trainer has to manually check the position of the analog controls to verify the settings.

In order to modify behavior, the person performs the training with a remote controlled training device. Often, however, a dog barks when no-one is around.

There is a need in the art, therefore, for a device that combines a stimulator function (requiring human activated controls) and a no-bark function (not requiring human interaction) in a single device. Additionally, there is a need to provide feedback to the user while extending battery life by eliminating analog controls.

BRIEF SUMMARY OF THE INVENTION

The wireless training device comprises a handheld wireless command module and a wireless receiver module connected to an adjustable collar assembly. The wireless command module is used to select a stimulation mode, a stimulation duration, and a stimulation intensity level through the use of one-touch digital switches located on the device front panel. The selected functions are displayed on an LCD screen, which provides convenient confirmation of the training program. The stimulation commands are transmitted to the wireless receiver module attached to the animal with an adjustable collar. The adjustable collar maintains the vibration motor and shock electrodes in close proximity to the animal's vocal cords. The transmitted stimulation commands are demodulated by the receiver module into control signals that trigger a shock, a vibration, or a shock and vibration. When the wireless receiver is placed in the no-bark mode, the wireless receiver module will generate a shock when triggered by a bark sensor. Power controllers built into both the wireless command module and wireless receiver module optimizes battery life by turning the devices off after a period of inactivity.

Other features and advantages of the present invention will become apparent from the following detailed description of the invention made with reference to the accompanying drawings.

These and other features, aspects and advantages of the present invention will be more fully understood when considered with respect to the following detailed description, appended claims and accompanying drawings wherein:

DETAILED DESCRIPTION OF THE INVENTION

Figure 1:
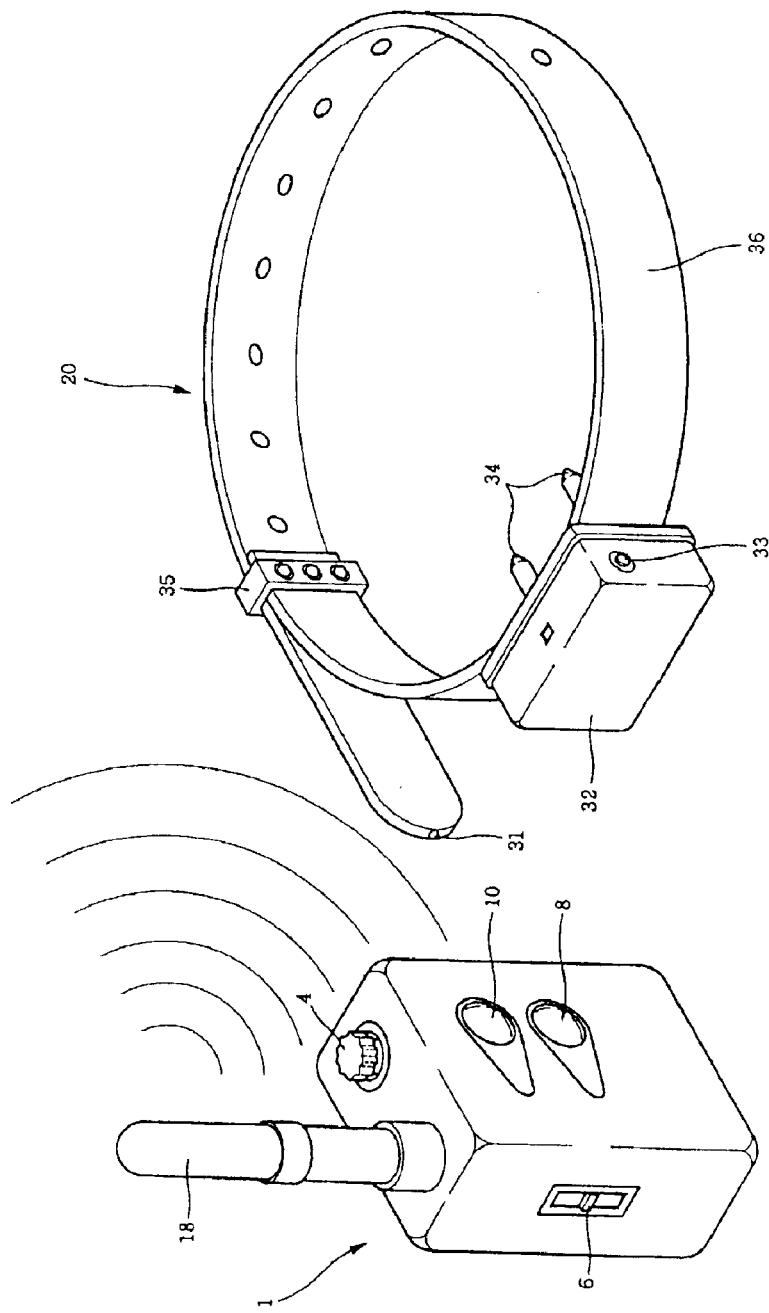
FIG. 1 is a perspective view of a prior art conventional animal training device.

FIG. 1 is a perspective view of a prior art conventional animal training device. A transmitter shown generally at 1 transmits commands via an antenna 18 to a receiver shown generally at 20, the receiver comprising a collar 36 with a buckle 35, an embedded antenna 31, a signal generator 32, and a pair of electrodes 34. The stimulation mode is selected by a 3-position mode selector switch 6, while the intensity level is adjusted by an analog intensity dial 4. Once the mode and intensity level has been selected, a trainer selects an instantaneous shock (nick) by pressing an instantaneous button 8 or a continuous shock by pressing a constant button 10. The instantaneous shock will stimulate the animal for approximately 0.4 seconds. The continuous shock lasts as long as the trainer presses the constant button 10.

When the instantaneous button 8 or constant button 10 is pressed, a microprocessor (not shown) generates control signals that are provided to the modulator for conversion into radio waves for transmission by antenna 18.

Figure 2:
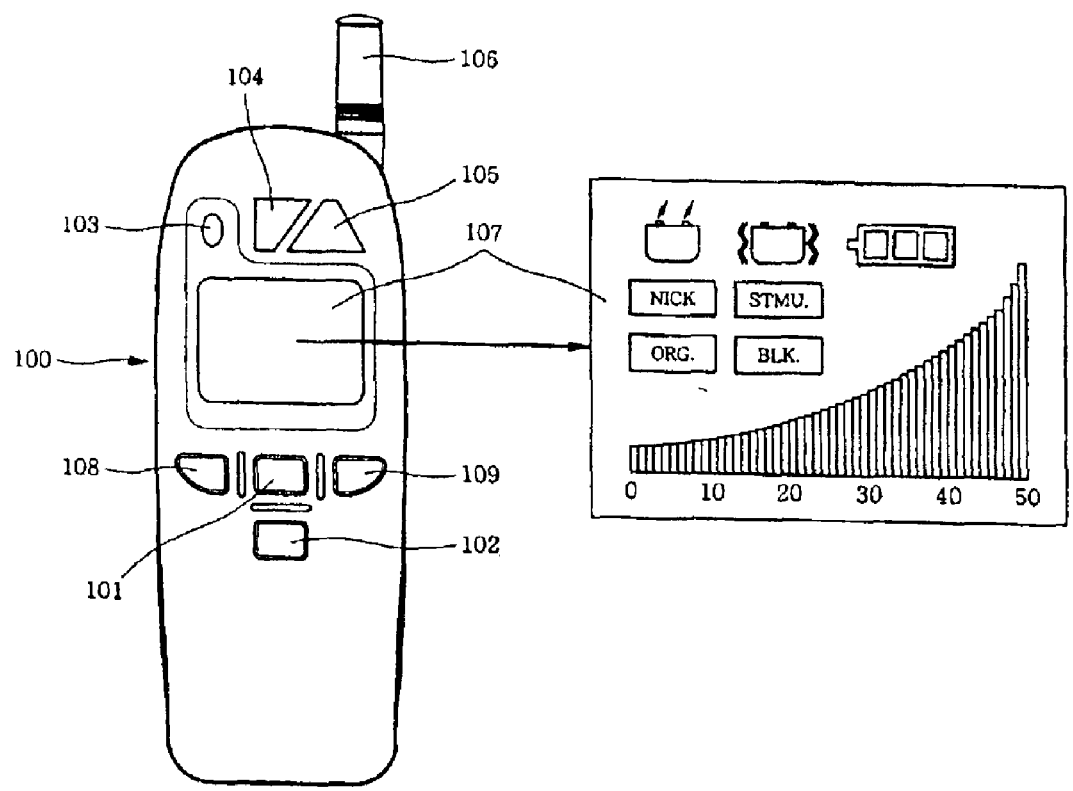
FIG. 2 is an illustration of a transmitter according to one embodiment of the present invention.

FIG. 2 is an illustration of a transmitter 100 according to one embodiment of the present invention. Also shown is an enlargement of a liquid crystal display (LCD) 107 for displaying shock wave status, the intensity level of the shock wave, type of stimulation (shock and/or vibration), the selected receiver, and the battery status.

Receiver selection is accomplished by pressing a receiver selection switch 103. In the present embodiment, two receivers are designated ORG and BLK. Alternate embodiments include multiple receivers designated by sequential numbers or letters. The method of addressing the receivers will be discussed with reference to the figures which follow. The shock wave level is increased by pressing a level increase switch 105, while shock wave level is decreased by pressing a level decrease switch 104. Pressing either level increase switch 105 or level decrease switch 104 will also increment or decrement a digital bar graph by one. Continuously pressing level switches 104 or 105 will continuously increase or decrease the shock wave level and the bar graph by one. Once the desired shock wave level is set, the mode of operation (shock, vibrate, no-bark, or a combination thereof) is controlled by pressing one of a plurality of mode switches 101, 102, 108, and 109. Vibrate output switch 108 selects a vibrate only mode, while vibrate and shock output switch 109 selects vibrate and shock. Shock only mode is selected by continuous output switch 102 or instant output switch 101.

Figure 3:
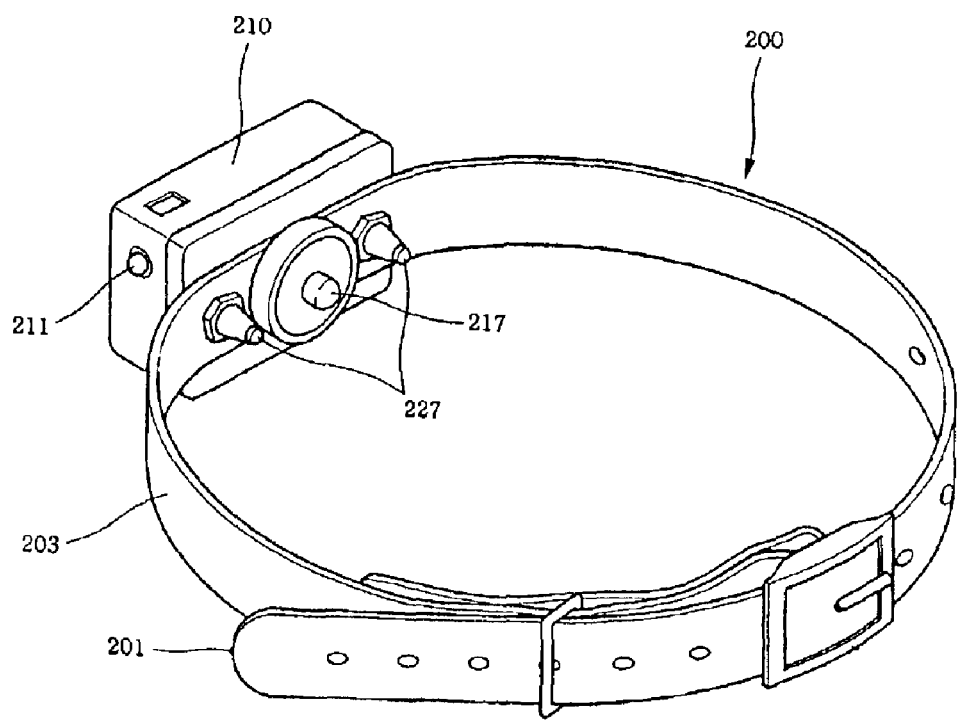
FIG. 3 is a perspective view of a receiver in one embodiment of the present invention.

FIG. 3 is a perspective view of a receiver in one embodiment of the present invention. The receiver, shown generally at 200, comprises a signal generator (wireless receiver module) 210 attached to an adjustable collar assembly 203, which contains an embedded receiving antenna 201. Adjustable collar assembly 203 maintains a pair of electrodes 227 and a barking sensor vibrator 217 in contact with the animal. A power switch 211 provides power to the receiver components and, upon receipt of a shut-down command from the microprocessor, turns the power off.

Figure 4:
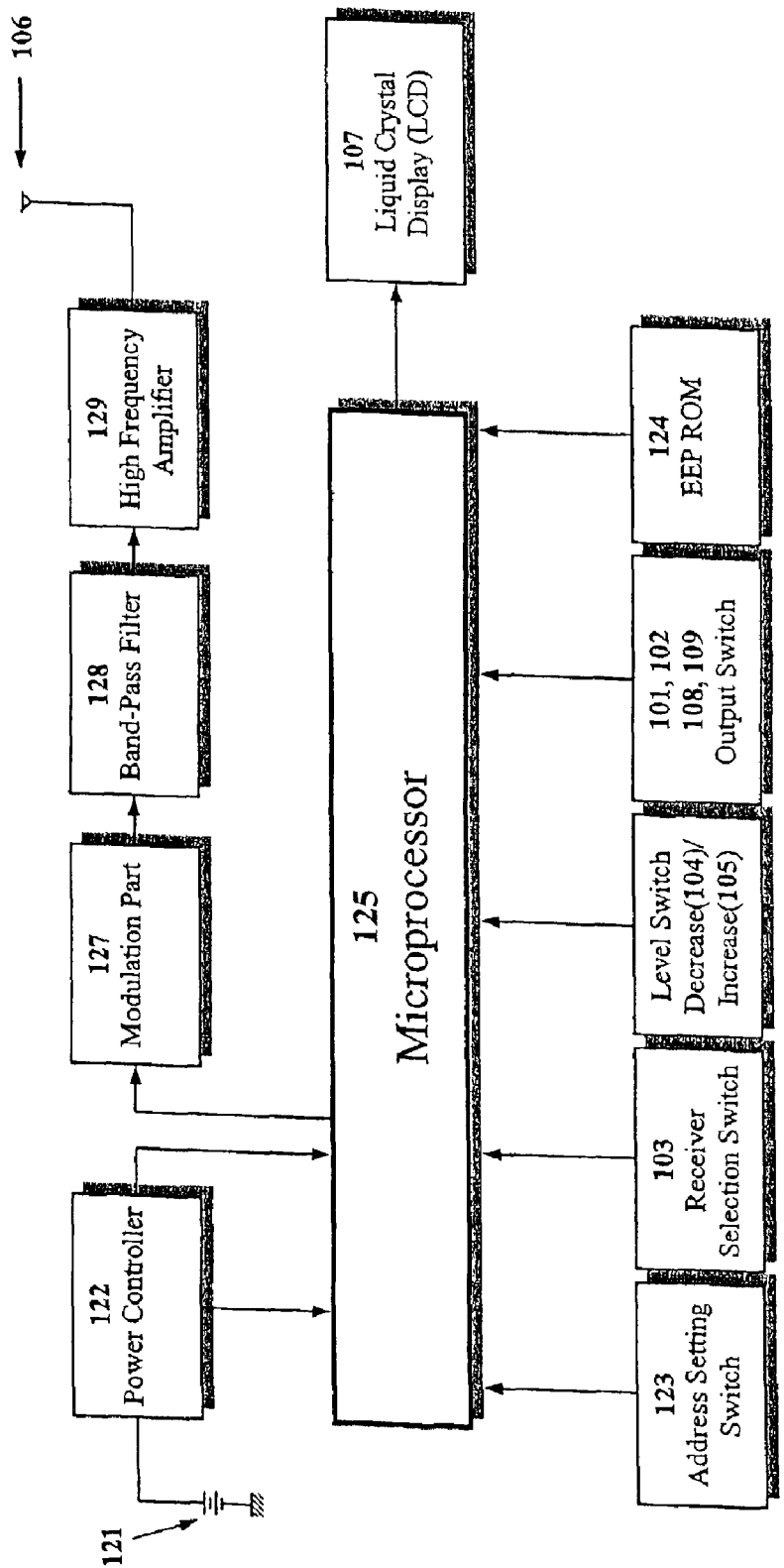
FIG. 4 is a block diagram of a wireless command module according to one embodiment of the present invention.

FIG. 4 is a block diagram of a wireless command module according to one embodiment of the present invention. A battery 121 provides unregulated voltage to a power controller 122, which provides regulated voltage to the wireless command module components and shuts off power to the transmitter components upon receipt of a shutdown command. A microprocessor 125 controls operation of the transmitter, generates control signals responsive to a plurality of switches, formats the control signals for transmission, and displays the operating mode on LCD 107. The microprocessor function may be implemented in various methods, such as operational logic formed in a field programmable gate array (FPGA) or may be integrated with other functions on an application specific integrated circuit (ASIC). Memory device EEP ROM 124 stores the various operating instructions, the stimulation level, and the microprocessor algorithm. EEP Rom 124 may be implemented in various forms such as non-volatile flash memory. Additionally, EEP ROM 124 may be external to the microprocessor 125, as shown in FIG. 4, or may be formed on the integrated circuit with the processor function.

Upon application of power, the microprocessor 125 performs a power-on self test (POST), initializes the transmitter, initializes an inactivity timer, reads the settings of the plurality of switches then reads the previously stored function and intensity level from EEP ROM 124. After reading the addresses defined by an address setting switch 123, microprocessor 125 stores the addresses in EEP ROM 124. In one embodiment of the invention, the addresses defined by address setting switch 123 are set manually by a plurality of dual inline package (DIP) switches. In an alternate embodiment, each address is programmable to allow the user to add addresses as needed.

In an alternate embodiment, the transmitter always sends out a specific address for the selected receiver. In this embodiment, the receiver has a plurality of DIP switches to set the receiver address to match the transmitter address.

After initialization, microprocessor 125 displays the receiver selection, function, and intensity level on LCD 107. Additionally battery status is displayed and continuously updated. At this point, the microprocessor 125 waits for the user to press an output switch: instantaneous output switch 101, continuous output switch 102, vibrate output switch 108 or vibrate and shock output switch 109. Once an output switch is pressed, microprocessor 125 generates a formatted transmission message containing the stimulation mode, stimulation intensity level, stimulation duration, and receiver address for processing by a modulation part 127.

Modulation part 127 generates an RF oscillation modulated with the transmission message. The modulated RF oscillation is then filtered by a band-pass filter 128 to remove harmonics and spurious signals outside the desired RF bandwidth. The filtered and modulated RF signal is amplified by a high frequency amplifier 129 for transmission by transmitting antenna 106.

Figure 5:
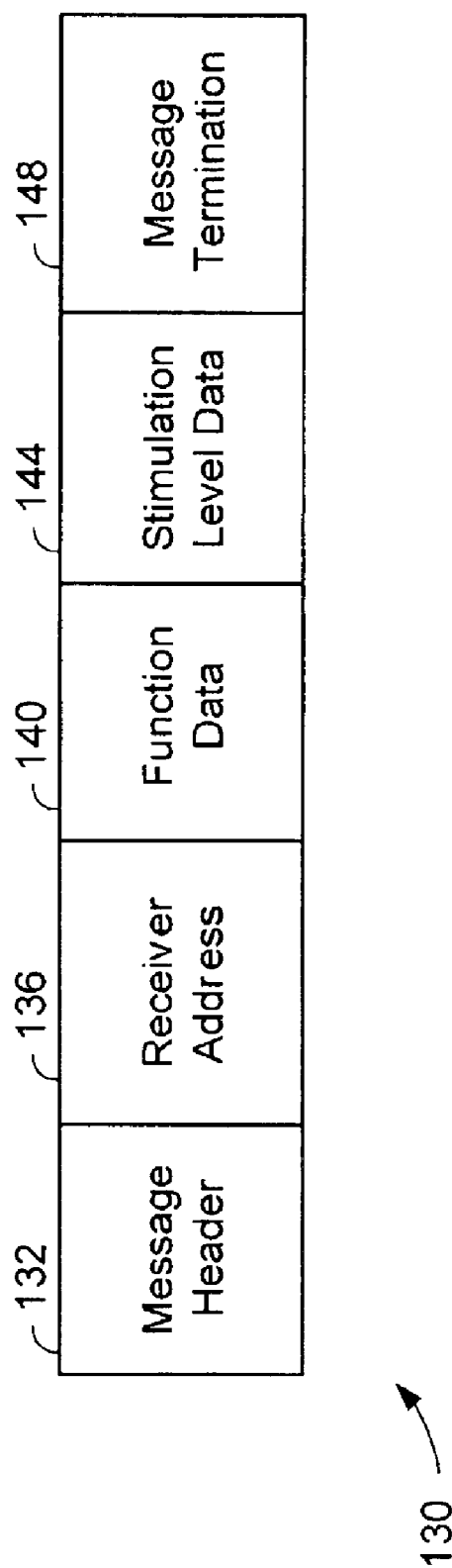
FIG. 5 is a diagram of a transmission message generated by a microprocessor.

FIG. 5 is a diagram of the formatted transmission message, shown generally at 130, generated by the microprocessor. A message header 132 contains a binary pattern to identify the start of a signal. A receiver address 136 contains the receiver address that identifies a specific receiver from a plurality of receivers. In one embodiment, the address of the receiver is received by the microprocessor as set by a plurality of DIP switches. Thus, according to a selected receiver, the microprocessor returns a previously specified corresponding address and inserts the address into receiver address 136. A function data 140 defines the desired stimulation: vibrate, vibrate and shock, instant shock, and continuous shock. In one embodiment, a no-bark function is also specified wherein the receiver module responds with a specified function whenever barking is detected. A stimulation level data 144 contains the desired shock level. A message termination 148 contains binary data that signifies the end of the message. In an alternate embodiment, the duration of the stimulation (i.e., shock and vibrate) is programmable. In this embodiment, the transmission message will contain a duration data part to define the length of stimulation. The length of the transmission message can be extended to accommodate added functionality of alternate embodiments.

Figure 6:
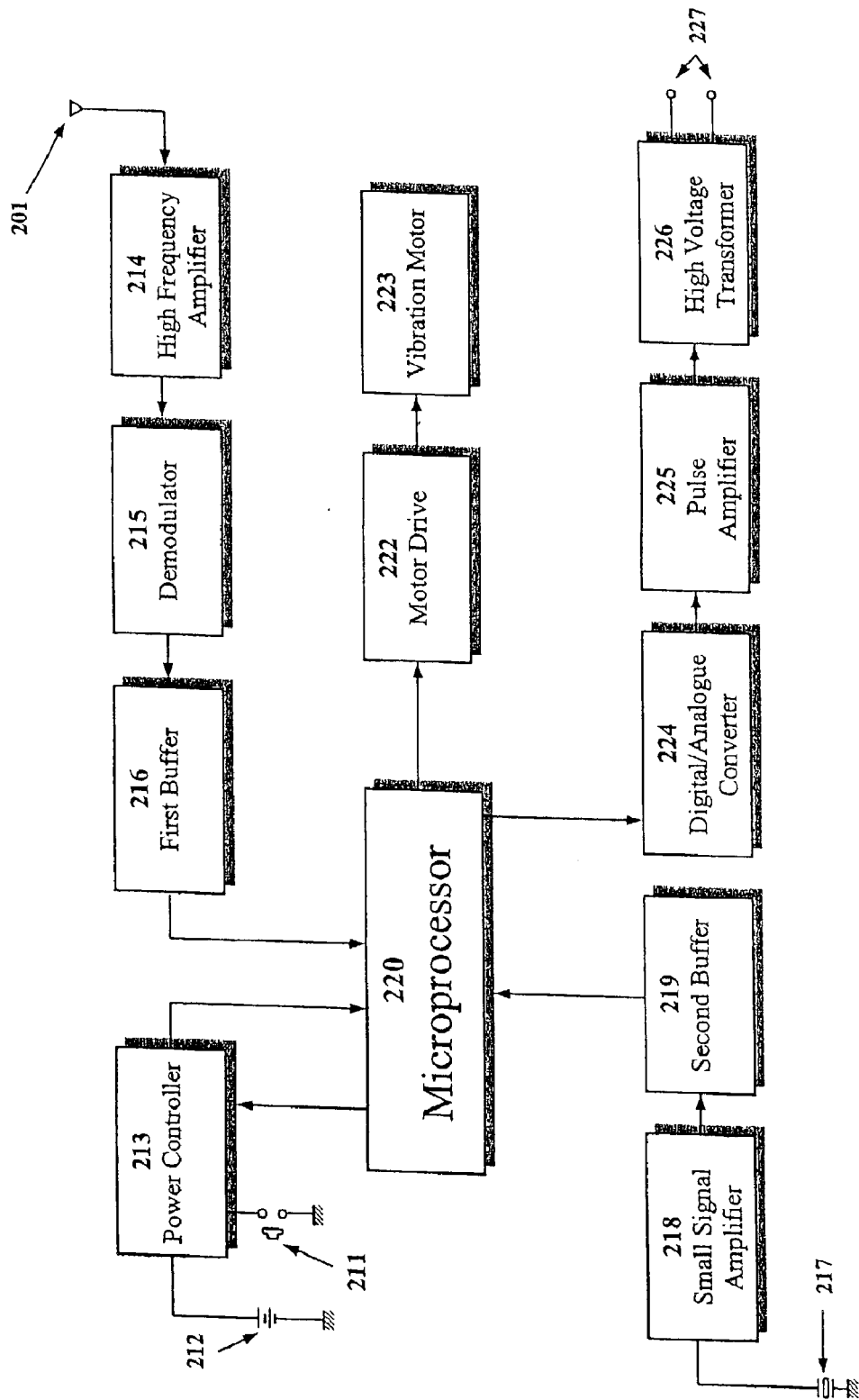
FIG. 6 is a block diagram of a wireless receiver module according to one embodiment of the present invention.

FIG. 6 is a block diagram of a wireless receiver module according to one embodiment of the present invention. A power switch 211 connects a battery 212 to a power controller 213 which regulates the battery voltage and provides a power off function upon receipt of a shut-down command from a microprocessor 220 generated as the result of the expiration of an inactivity timer.

Receiving antenna 201 couples the low level modulated RF signal to a high frequency amplifier 214 which amplifies the low level modulated RF signal to a level suitable for a demodulator 215. Demodulator 215 separates the transmission message from the RF oscillation and provides the transmission message to a first buffer 216. First buffer 216 forms the formatted transmission message into a digital format that can be read by microprocessor 220.

Microprocessor 220 controls operation of the wireless receiver module by decoding the digital data received from first buffer 216 to determine if the receiver address matches the internal address. Microprocessor 220 discards the decoded digital data if the receiver address does not match the internal address. If the receiver address is correct, then the function data and stimulation level data are processed and the appropriate stimulation module is activated. If the selected stimulation mode is vibrate, then the microprocessor provides a vibrate control signal to a motor drive 222 which converts the digital vibrate control signal into a waveform suitable for driving a vibration motor 223.

When the stimulation mode is shock, microprocessor 220 provides a shock control signal to a digital-to-analog converter 224 which will convert the digital data into an analog shock waveform. The shock analog waveform is amplified to a predetermined level by a pulse amplifier 225 before being coupled to a high-voltage transformer 226 wherein the shock analog waveform is boosted to a level sufficient to cause a shock. The output of the high-voltage transformer is coupled to a pair of shock electrodes 227 which couple the shock analog waveform to the animal.

An operating mode switch (not shown) defines two modes of operation: training and bark prevention. In the bark prevention, i.e., no-bark mode, a bark sensor 217 generates a small signal responsive to the barking. A small signal amplifier 218 amplifies the small signal to a higher level that can be converted to digital data by a second buffer 219. The output of second buffer 219 is coupled to microprocessor 220, which analyzes the digital data to determine if the animal barked. If the analysis is positive, wherein the animal did indeed bark, the microprocessor sends a shock control signal which causes a shock in the manner previously described. The no-bark mode, in the present embodiment, will generate a shock at the onset of barking. In an alternate embodiment, a barking threshold is envisioned such that a programmable level of barking is allowable, but once that programmable level is exceeded the microprocessor sends a shock control signal thereby generating the shock. Another embodiment provides for the selection of shock, vibrate, or both, when the no-bark mode is selected.

When the operating mode switch is set to the training mode, the microprocessor operates according to commands received from the transmitter as previously described. In an alternate embodiment, the operating mode switch is replaced by a software function wherein a function key on the wireless command module changes the operating mode. The operating mode status is included as an additional data packet in the formatted transmission message.

Figure 7:
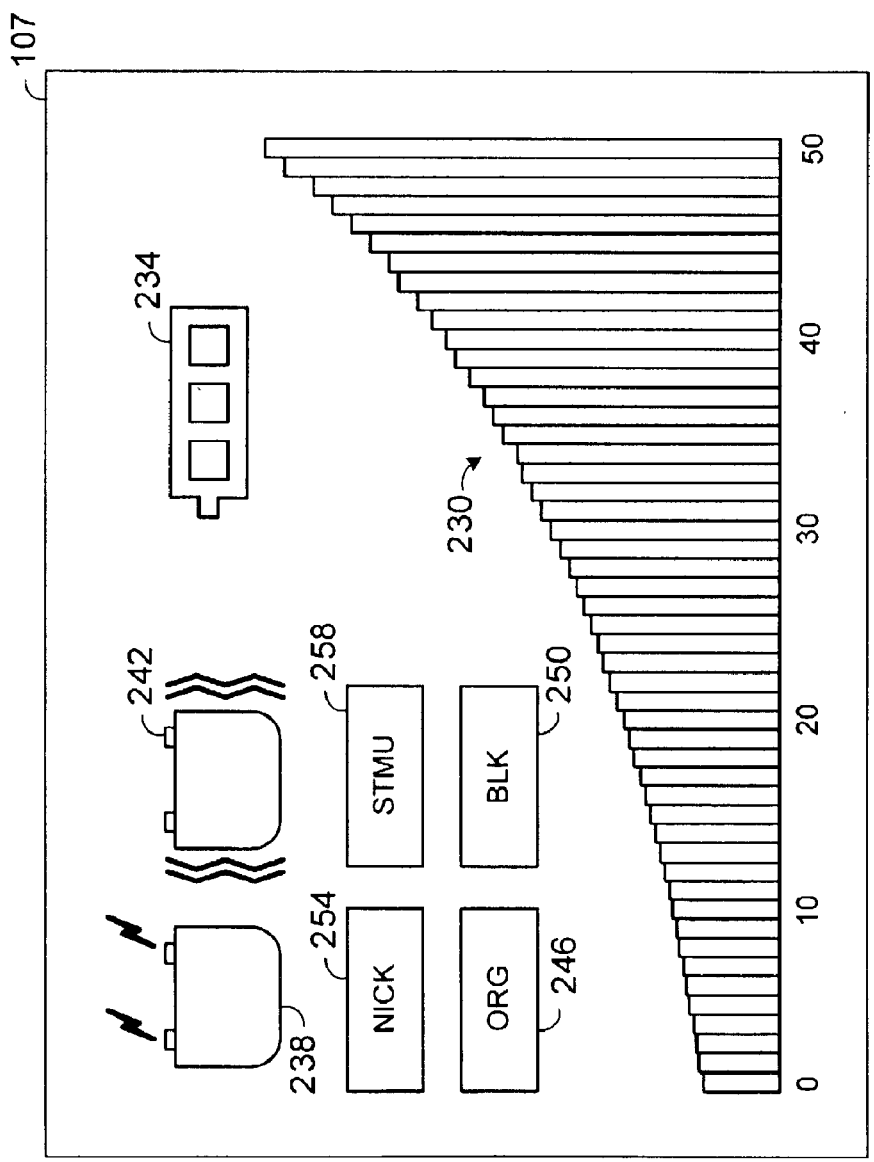
FIG. 7 is an illustration of the liquid crystal display (LCD) in one embodiment of the present invention.

FIG. 7 is an illustration of the liquid crystal display (LCD) 107 of one embodiment of the present invention. An intensity level bar graph 230 shows the selected intensity level. As level decrease switch 104 and level increase switch 105 of FIG. 2 are pressed, the bar graph level decreases or increases, respectively. A battery status 234 indicates the estimated residual battery power. Graphical symbols 238 and 242 indicate the selected stimulation mode according to the mode selected by output mode switches 108 and 109 of FIG. 2. Graphical symbol 238 indicates the shock mode has been selected while symbol 242 indicates the vibrate mode has been selected. When the shock and vibrate mode is selected, both graphical symbols 238 and 242 will be on. Receiver selection is indicated by symbols 246 and 250. Symbol 246, ORG, indicates that a primary receiver is selected, while symbol 250, BLK, indicates a secondary receiver has been selected. In an alternate embodiment, the ORG and BLK could be replaced by a plurality of alphanumeric symbols to allow animal names to be programmed into the display. Using this method, the trainer could more easily identify the selected receiver. Symbols 254 and 258 illuminate for a brief period during message transmission to verify the transmission is underway. Symbol 254, NICK, indicates a shock command is being transmitted, while symbol 258, STMU, indicates a vibrate command is being transmitted. The inventive wireless command module includes circuitry that defines logic to generate the described display.

Figure 8:
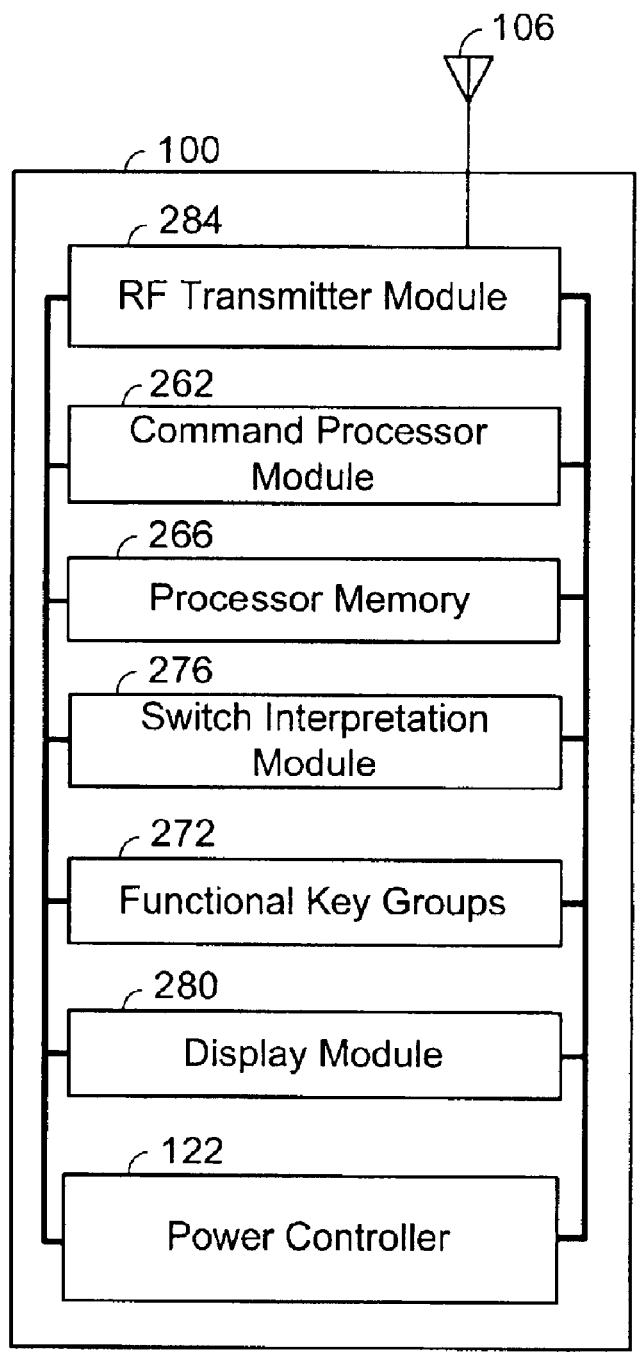
FIG. 8 is a functional schematic diagram of the wireless command module according to one embodiment of the present invention.

FIG. 8 is a functional schematic diagram of the wireless command module 100 according to one embodiment of the present invention. A power controller 122 performs the power management function as previously described. When first turned on, a command processor module 262 performs a power-on self test (POST), initializes an RF transmitter module 284, and reads the switch settings defined by a switch interpretation module 276. During POST, command processor module 262 resets an inactivity timer. This inactivity timer defines the period of time after which command processor module 262 issues a shut-down command to power controller 122. The inactivity timer is re-set each time a key is pressed.

Functional key groups 272 define three functional groups of one-touch switches to control operation of wireless command module 100. When a one-touch key is pressed, switch interpretation module 276 determines which key was pressed and then provides the information to command processor module 262. Command processor module 262 updates a display module 280 and adds the selected stimulation mode to the formatted transmission message, if required. If the key pressed was an output switch, i.e. vibrate or shock key, the formatted transmission message is provided to RF transmitter module 284 for transmission via a transmitter antenna 106. A processor memory 266 stores the command processor module process algorithm, as well as the selected operating mode and receiver address. Processor memory 266 comprises logic circuitry and EEP ROM 124, as described in FIG. 4.

Figure 9:
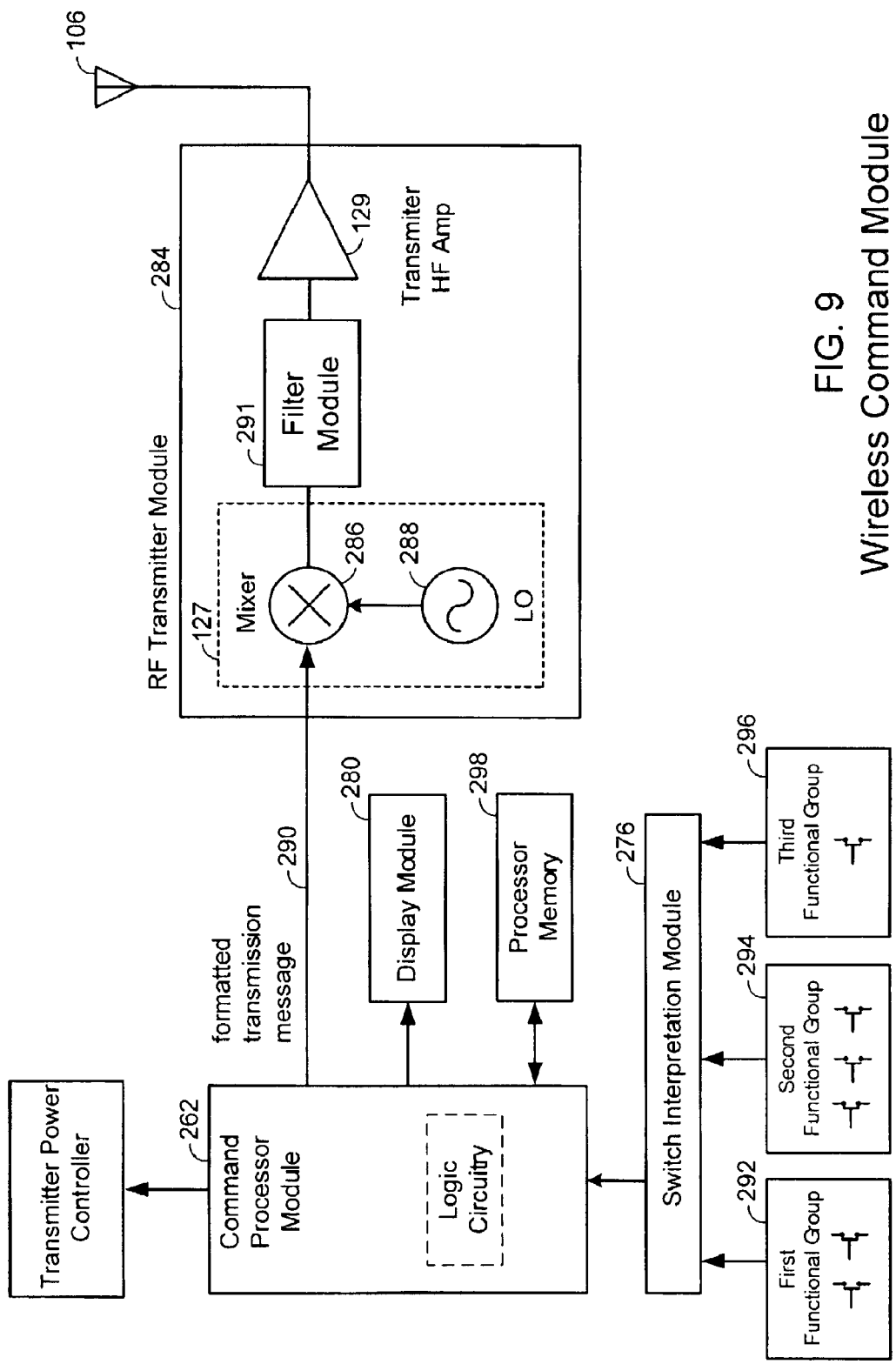
FIG. 9 is a functional schematic diagram of the wireless command module showing a detailed view of an RF transmitter module.

FIG. 9 is a functional schematic diagram of the wireless command module 100 showing a detailed view of RF transmitter module 284. Modulation part 127 comprises a mixer 286 and a local oscillator (LO) 288. Mixer 286 receives the formatted transmission message from command processor module 262 on line 290. The LO 288 frequency of oscillation, set to the desired RF carrier frequency, is coupled to mixer 286 where it is mixed to form a modulated RF signal. The modulated RF signal is provided to a filter module 291 wherein frequencies below a low corner frequency and above a high corner frequency are sharply attenuated. The filtered modulated RF signal is coupled to a high frequency (HF) amplifier 129 for transmission via transmitter antenna 106.

In wireless command module 100, switches are grouped according to function, in which a first functional group 292 comprises a plurality of switches for selecting a receiver address and for defining a plurality of addresses corresponding to the receivers in use. A second functional group 294 comprises a plurality of switches for setting the stimulation mode. A third functional group 296 comprises at least one one-touch switch for setting a stimulation intensity level. The output of each functional group is coupled to switch interpretation module 276 wherein the switch information is encoded for processing by command processor module 262. Display module 280 comprises logic circuitry and LCD 107 (not shown)., Logic circuitry is for generating graphical symbols responsive to control signals received from command processor module 262. LCD 107 operates as described in FIG. 7.

Figure 10:
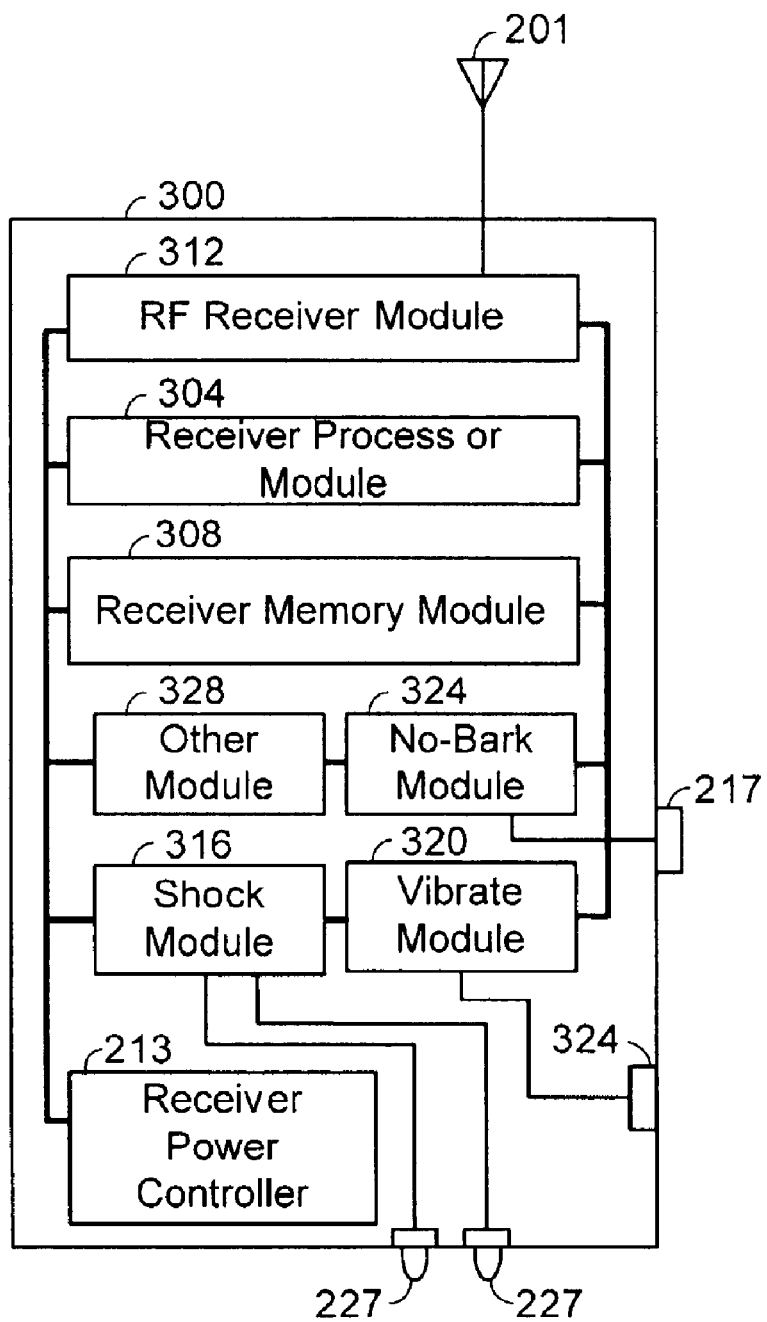
FIG. 10 is a functional schematic diagram of the wireless receiver module according to one embodiment of the present invention.

FIG. 10 is a functional schematic diagram of the wireless receiver module 300 according to one embodiment of the present invention. A power controller 213 operates as previously described in FIG. 6. A receiver processor module 304 contains logic circuitry to control operation of the wireless receiver module 300 according to program instructions stored in a receiver memory module 308. In the present embodiment, receiver memory module 308 is formed in EEPROM external to receiver processor module 304, however, receiver memory module 308 could be formed in a variety of known formats either internal or external to receiver processor module 304. Receiver memory module 308 could also be formed in alternate embodiments such as non-volatile flash memory. Receiver processor module 304 also processes digital data, received from an RF receiver module 312 via an antenna 201, into a plurality of stimulation control signals responsive to the transmitted control commands received from the wireless command module. The stimulation control signals are provided to a shock module 316 and a vibrate module 320. Shock module 316 processes the shock control signal into a shock analog voltage sufficient to cause a shock to be generated at shock electrodes 227. Vibrate module 320 processes the vibrate control signal in a waveform sufficient to drive a vibration motor 223. In the no-bark operating mode, bark sensor 217 provides vibrations, responsive to the barking, to no-bark module 324. Upon receipt of the vibrations, no-bark module 324 processes the vibrations into a digital signal suitable for processing by receiver processor module 304 which then sends a vibrate control signal to vibrate module 320, thus preventing barking.

Other module 328 anticipates alternate embodiments that may include sonic or ultrasonic functions. Sonic functions may include programmable commands synthesized from the trainer's voice to control animal behavior. An ultrasonic function would use variable strength sound waves (higher than the human hearing range) to train the animal.

Figure 11:
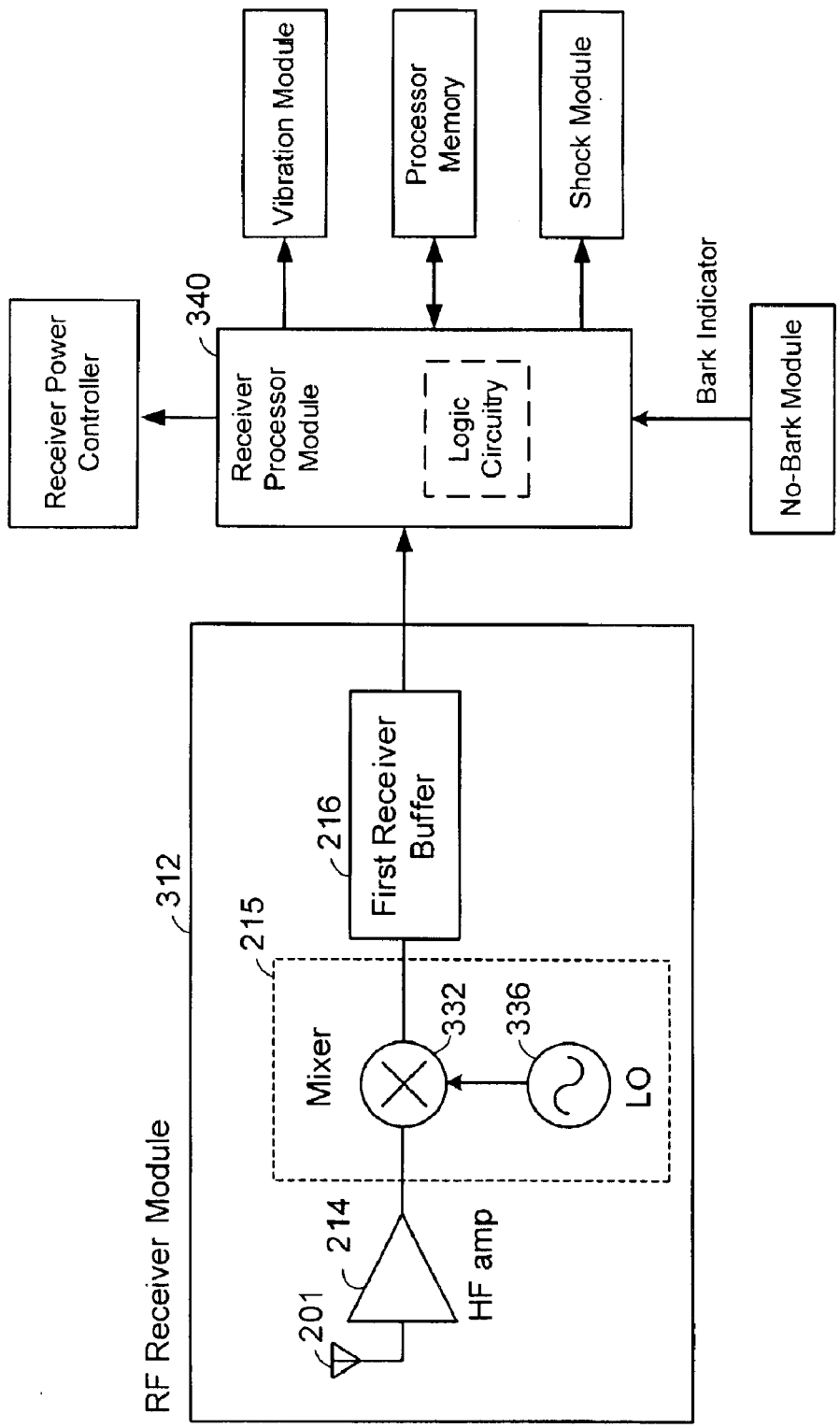
FIG. 11 is a functional schematic diagram of the wireless receiver module showing a detailed view of an RF receiver module.

FIG. 11 is a functional schematic of the wireless receiver module 200 showing a detailed view of an RF receiver module 312. The modulated RF signal is coupled to a high frequency (HF) amplifier 214 by receiving antenna 201. The modulated RF signal is amplified by a fixed gain by HF amplifier 214 and then coupled to a demodulator 215. Demodulator 215 comprises a mixer 332 and a local oscillator (LO) 336. LO 336, oscillating at the selected carrier frequency, is coupled to mixer 332 which separates the amplified modulated RF signal into the carrier frequency and the formatted transmission message. The formatted transmission message is coupled to a first buffer 216 wherein the formatted transmission message is formed into a digital signal suitable for interpretation by a receiver processor module 304.

Figure 12:
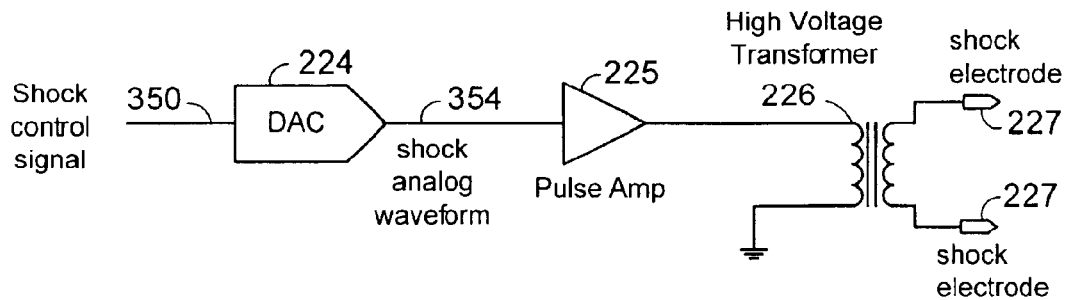
FIG. 12 is a detailed schematic diagram of a shock module.

FIG. 12 is a detailed schematic of the shock module 316 of FIG. 10. When the stimulation mode is set to shock, receiver processor 304 (not shown) provides a shock control signal by way of line 350 to a digital to analog converter (DAC) 224, which converts the digital data into an analog shock waveform. The shock analog waveform, provided to a pulse amplifier 225 by way of line 354, is amplified to a predetermined level by pulse amplifier 225 before being coupled to a high voltage transformer 226. High voltage transformer 226 boosts the shock analog waveform to a level defined by the turns ratio of the transformer. The output of high voltage transformer 226 is coupled to shock electrodes 227 which couple the shock waveform to the animal.

Figure 13:
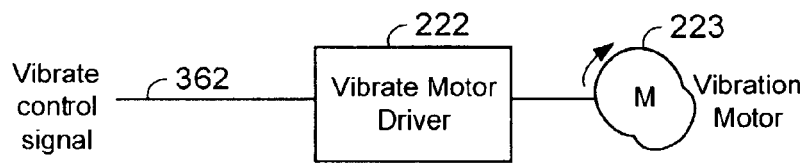
FIG. 13 is a detailed schematic diagram of a vibrate module.

FIG. 13 is a detailed schematic diagram of a vibrate module 320. When the selected stimulation mode is vibrate, receiver processor module 304 (not shown) generates a vibrate control signal to a vibration motor driver 222 by way of line 362, which converts the digital vibrate control signal into a waveform suitable for driving a vibration motor 223. As may be seen, vibration motor 223 includes a non-symmetrical shaped rotating head to generate a vibrating sensation.

Figure 14:
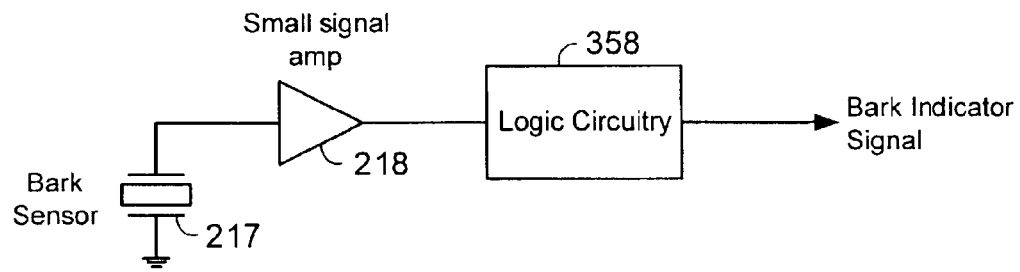
FIG. 14 is a detailed schematic diagram of a no-bark module.

FIG. 14 is a detailed schematic diagram of no-bark module 324. In the bark prevention mode, i.e. no-bark mode, a bark sensor 217 generates a small signal responsive to the barking. A small signal amplifier 218 amplifies the small signal to produce an amplified small signal that can be converted to digital data by logic circuitry 358. In the present embodiment, logic circuitry 358 forms the amplified small signal into digital data for further processing by the receiver processor module. The no-bark mode, in the present embodiment, will generate a shock at the onset of barking. In an alternate embodiment, logic circuitry 358 can be programmed to allow a moderate amount of barking but will trigger an output once the barking crosses a predetermined threshold. Once triggered, logic circuitry 358 generates a bark indicator signal that is provided to the receiver processor module for further processing. Thus, in the alternate embodiment, a barking threshold is envisioned such that a programmable level of barking is allowable but once that threshold is exceeded the receiver processor module generates a shock. In other embodiments, any selected mode and intensity level may define a training response whenever barking is detected above the specified level.

Figure 15:
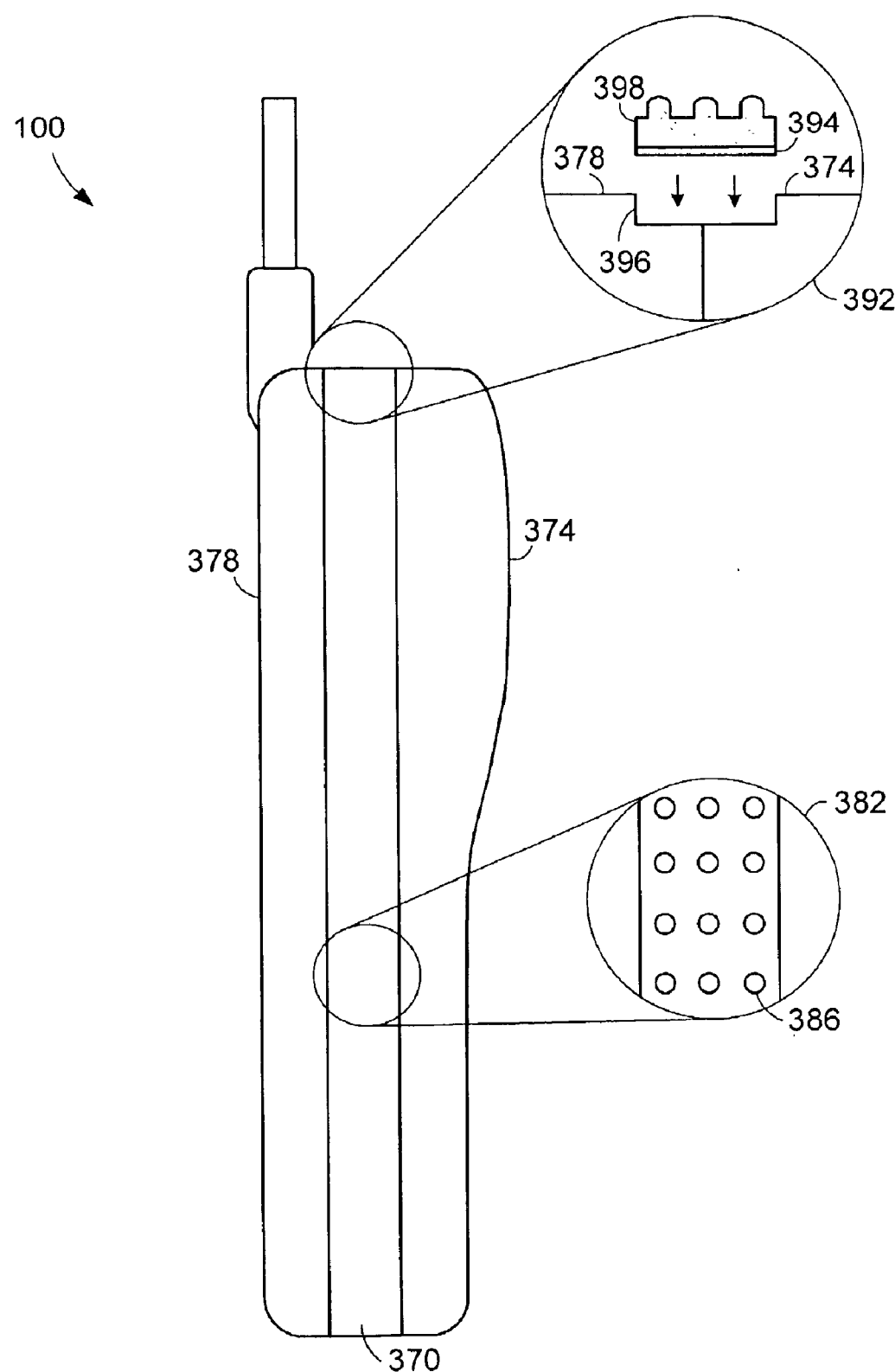
FIG. 15 is a side view of the wireless command module showing a sealing belt installed on the circumference of the wireless command module.

FIG. 15 is a side view of the wireless command module 100 showing a sealing belt 370 installed on the circumference of the wireless command module 100. Exploded view 392 illustrates a lip 396 formed by a frontal cover 374 and a rearward cover 378. The sealing belt, shown in cross-section 398, is coated with an adhesive 394 then pressed into lip 396 to form a water resistant seal. Exploded view 382 illustrates the plurality of protrusions 386 extending outwardly from the sealing belt thereby facilitating a good grip.

Figure 16A:
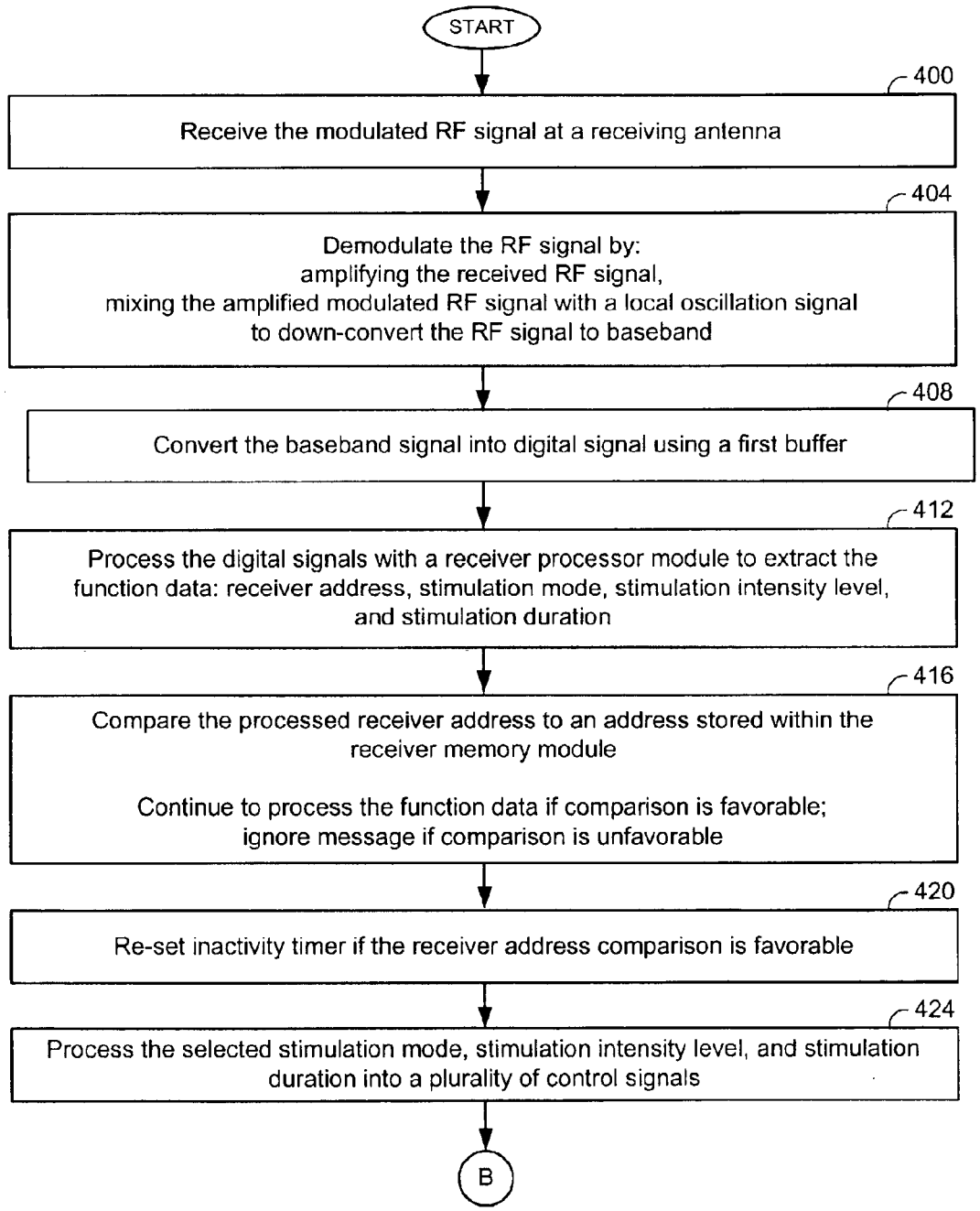
FIGS. 16a and 16b are flow charts of a receiver method.
Figure 16B:
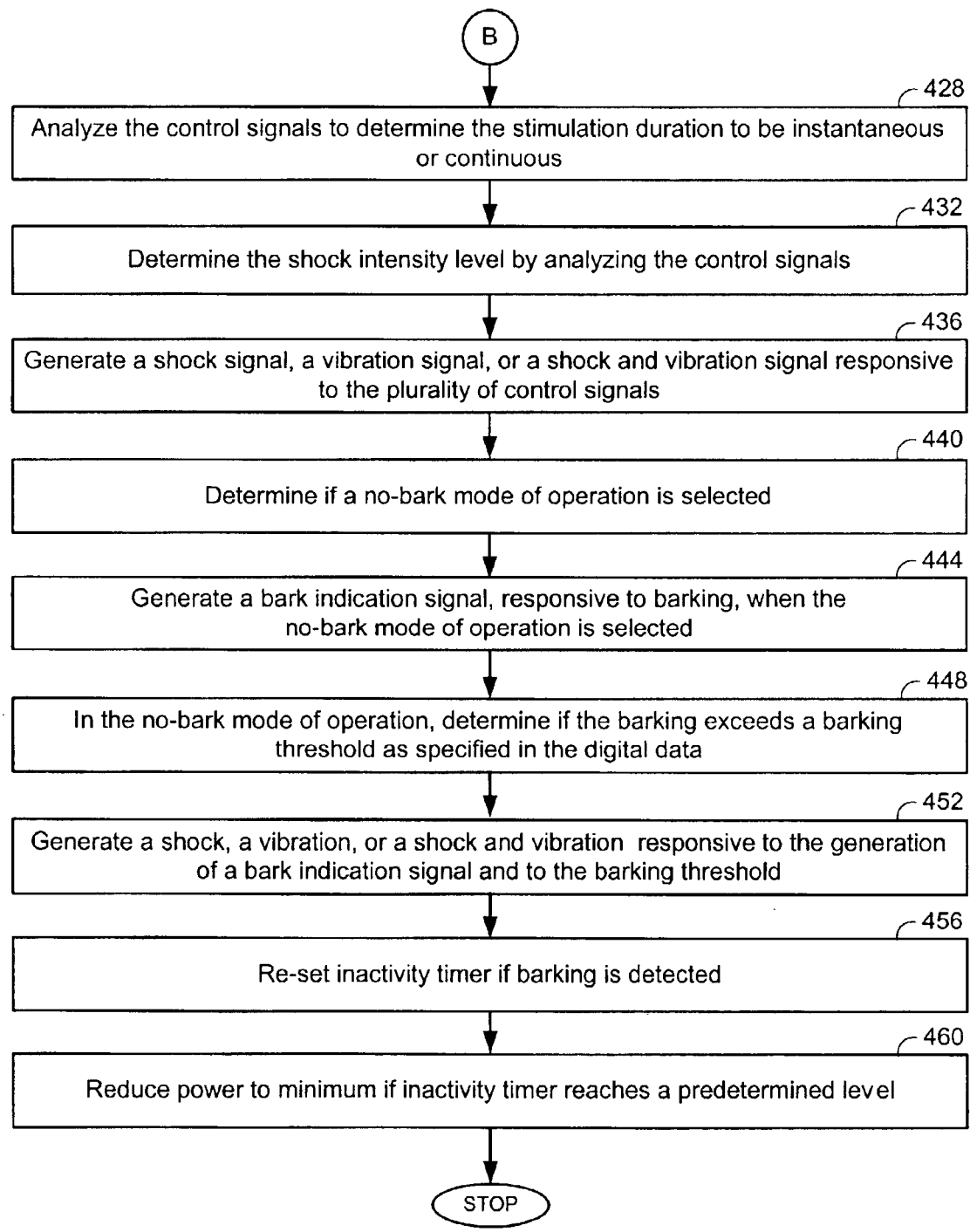

FIGS. 16a and 16b are flow charts of a receiver method. The transmitted modulated RF signal is received at a receiving antenna (step 400). The received signal is demodulated by amplifying and mixing the received RF signal with a local oscillation signal to down-convert the RF to baseband (step 404). A first buffer converts the baseband signal into digital signals suitable for processing by a receiver processor module (step 408). The receiver processor module extracts the function data (receiver address, stimulation mode, stimulation intensity level, and stimulation duration) from the digital signals (step 412). The receiver processor module compares the received receiver address to an address stored internally within the receiver memory module. If the comparison is favorable (i.e., the addresses are identical) the receiver processor module continues to process the function data. The rest of the function data is ignored if the comparison is unfavorable (step 416). An inactivity timer is re-set (set to zero) if the receiver address comparison is favorable (step 420).

After a favorable receiver address comparison, the receiver processor module continues to process the stimulation mode, stimulation intensity level, and stimulation duration to create a plurality of control signals (step 424). The plurality of control signals are coupled to a shock module, a vibration module, and a no-bark module responsive to the commands transmitted from a wireless command module. The stimulation duration is determined to be instantaneous or continuous by analyzing a duration control signal (step 428). The shock intensity level is set according to the intensity control signal processed from the function data (step 432). The stimulation modules generate a shock, a vibration, or a shock and vibration responsive to the plurality of control signals received from the receiver processor (step 436).

The receiver processor also determines that a no-bark mode of operation is selected (step 440). When selected, the no-bark module generates a bark indication signal that is coupled to the receiver processor module (step 444). In the no-bark mode of operation, the receiver processor module determines if the bark indication signal exceeds a barking threshold as specified in the digital data (step 448). If the barking exceeds the barking threshold, the receiver processor module generates a shock signal, a vibration signal, or a shock and vibration signal to the simulation modules (step 452). In the no-bark mode, the inactivity timer is re-set upon the generation of the bark indication signal (step 456). Unless re-set by an activity indicating the stimulation module is in-use, the inactivity timer will continue to count up to a predetermined maximum value at which time it will signal the receiver processor module to turn the power controller off in order to save power (step 460)

Figure 17:
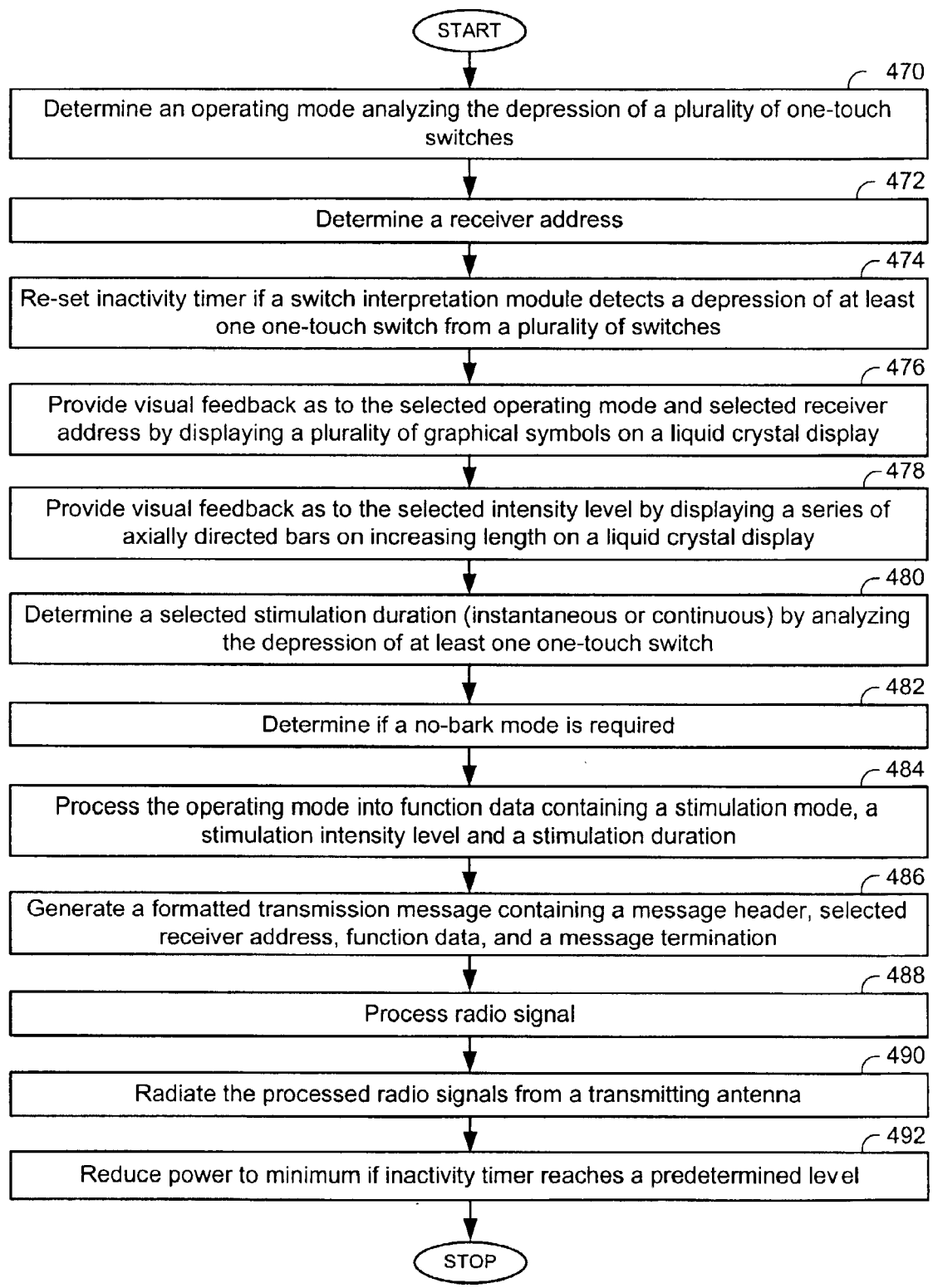
FIG. 17 is a transmitter method flow chart.

FIG. 17 is a transmitter method flow chart. The operating mode is determined by analyzing a plurality of one-touch switches (step 470). A receiver address is determined by analyzing the at least one one-touch switch (step 472). Each time a switch interpretation module detects a switch depression, an inactivity timer is re-set (step 474). Confirmation of the selected operating mode and receiver address is provided by displaying a plurality of graphical symbols on a liquid crystal display (step 476). The selected intensity level is shown on the liquid crystal display by displaying a series of axially directed bars of increasing length to reflect increasing intensity level (step 478).

A selected stimulation duration can be either instantaneous or continuous. The stimulation duration is determined by analyzing a plurality of one-touch switches (step 480). In the continuous mode the stimulation will continue as long as a "continuous" one-touch switch is pressed. The instantaneous mode will generate the stimulation for a predetermined period of time. An alternate training mode, a no-bark mode, provides a stimulation (shock, vibration, shock and vibration) whenever barking is detected. The no-bark mode is selected by pressing at least one one-touch switch (step 482).

The command processor module processes the selected operating modes into function data containing the selected stimulation mode, selected stimulation intensity level, and the selected stimulation duration (step 484). The command processor further processes the function data and the selected receiver address into a formatted transmission message containing a message header and a message termination (step 486). The formatted transmission message is processed into a radio signal (step 488) then transmitted for reception by the selected receiver. The method of processing the formatted transmission message into a radio signal comprises: mixing the formatted transmission message with a local oscillation signal operating at a selected RF frequency to create a modulated RF signal. The modulated RF signal is filtered by a filter module to remove signal components below and above the selected RF frequency. After amplification the processed radio signal is radiated from a transmitting antenna (step 490).

The command processor module monitors an inactivity timer that continuously increments when the command module is in an active state. Unless the inactivity timer is reset by the command processor, the inactivity will reach a predetermined level, at which time the command processor will generate a shut-down command that instructs the power controller to reduce system power to a minimum (step 492).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in an animal behavior modification system command module comprising:
   determining an operating mode, the operating mode further comprising:
      determining a stimulation mode, wherein the selected stimulation mode is one of a shock, a vibration, or a shock and vibration;
      determining a stimulation intensity level; and
      determining a stimulation duration, wherein the stimulation duration is one of an instantaneous stimulation and a continuous stimulation;
   providing visual feedback as to the selected operating mode by displaying a plurality of graphical symbols on a liquid crystal display (LCD);
   providing visual feedback of the selected stimulation intensity level by displaying a series of axially directed bars of increasing length to reflect increasing levels of intensity; and
   transmitting the selected stimulation mode, stimulation intensity level and stimulation duration as determined by the selected operating mode.

2. The method of claim 1 further including determining a selected receiver address from a group of receiver addresses, which group of receiver addresses includes at least one stored receiver address, and transmitting the selected receiver address.

3. The method of claim 1, wherein the step of determining the operating mode further comprises coupling a plurality of one-touch switches to a switch interpretation module for receiving outputs of the plurality of one-touch switches.

4. The method of claim 3 further comprising, in the switch interpretation module, forming the outputs of the plurality of one-touch switches into a digital format suitable for processing by a receiver processor module.

5. The method of claim 1 further including the step of generating a formatted transmission message containing a message header, the at least one stored receiver address, function data containing the selected operating mode, and a message termination.

6. The method of claim 1, wherein transmitting the selected operating mode further comprises:
processing radio signals, said processing comprising:
generating a local oscillation signal at a selected RF signal;
mixing the formatted transmission message with the local oscillation signal to create a modulated RF signal;
filtering the modulated RF signal to remove signal components below and above the selected RF signal;
amplifying the filtered modulated RF signal; and
radiating the filtered amplified modulated RF signal from a transmitting antenna.

7. The method of claim 6, performed in an RF receiver module, further comprising:
receiving the modulated RF signal at a receiving antenna;
amplifying the modulated RF signal;
down-converting the modulated RF signal to a baseband signal; and
converting the baseband signal, by the use of a first buffer, into a digital format suitable for processing by a receiver processor module.

8. The method of claim 7, wherein the method of down-converting the modulated RF signal to a baseband signal further comprises:
generating a local oscillation signal at a selected RF signal; and
mixing the local oscillation signal with the amplified modulated RF signal to produce a baseband frequency.

9. The method of claim 7, further including:
receiving the converted baseband signal at a receiver processor module;
processing the received converted baseband signal to recover the at least one stored receiver address and the operating mode;
comparing the at least one stored receiver address processed to an internal stimulation module address and continuing to process the received modulated RF signal if the at least one stored receiver address matches a stored address within a receiver memory module;
converting the operating mode into a plurality of control signals;
coupling the plurality of control signals to at least one of a shock module and a vibrate module; and
generating at least one of a shock, a vibration, or a shock and vibration responsive to the plurality of control signals.

10. The method of claim 1, further including reducing power to a reduced level upon the expiration of an inactivity timer.

11. The method of claim 10 wherein the inactivity timer is re-set each time the switch interpretation module determines at least one of the plurality of one-touch switches has been activated.

12. A method, in a wireless receiver module of an animal behavior modification system, comprising:
receiving radio frequency (RF) signals;
down-converting the received RF signals to baseband frequency signals containing a formatted transmission message;
converting the baseband frequency signals from analog to a digital format to create a digitally formatted transmission message containing control signals;
determining if a receiver address within the digitally formatted transmission message containing control signals matches a stored address within the receiver address;
determining a specified stimulation mode; and
stimulating an animal with one of a shock, a vibration, or a shock and vibration if the receiver address matches the stored address.

13. The method of claim 12, further including; determining an animal has barked; and generating a stimulation responsive thereto.

14. The method of claim 13 wherein the step of determining that the animal has barked further includes determining if the barking exceeds a barking threshold.

15. The method of claim 14 further includes the step of generating the stimulation if the detected barking exceeds the barking threshold.

16. The method of claim 15 wherein the barking threshold is specified in the digitally formatted transmission message containing control signals.

17. The method of claim 12, wherein the down-converting step further includes:
generating a local oscillation signal at the selected RF signal; and
mixing the local oscillation signal with a modulated RF signal to produce a down-converted formatted transmission message containing control signals.

18. The method of claim 12, wherein the stimulating step further includes stimulating the animal according to a selected stimulation mode, a stimulation intensity level and a stimulation duration.

19. The method of claim 12 further including:
receiving the down-converted digitally formatted transmission message containing control signals at a receiver processor module;
separating the plurality of control signals from the digitally formatted transmission message;
coupling the plurality of control signals to at least one of a shock module and a vibrate module; and
generating at least one of a shock, a vibration, or a shock and vibration responsive to the plurality of control signals.

20. The method of claim 12, further including reducing power to a reduced level upon the expiration of an inactivity timer.

21. The method of claim 20 wherein the inactivity timer is re-set each time the shock, the vibration, or the shock and vibration is generated.

22. The method of claim 12 further including generating a selected stimulation whenever it is determined that the animal has barked.

23. The method of claim 22 further including the step of generating a vibration.

24. The method of claim 22 further including the step of generating a shock.

25. The method of claim 24 wherein the step of generating the shock further includes the step of setting a stimulation intensity level and a stimulation duration as specified in the digitally formatted transmission message containing control signals.

26. The method of claim 22 further including the step of generating a shock and vibration.

27. The method of claim 26 wherein the step of generating the shock and vibration further includes the step of determining the stimulation duration to be instantaneous or continuous.

28. The method of claim 12, further including the method of maintaining a system power by reducing power to minimum upon the expiration of an inactivity timer.

29. The method of claim 28 wherein the inactivity timer is re-set each time a receiver address matches a stored receiver address.

30. The method of claim 28 wherein the inactivity timer is re-set each time barking is detected and the no-bark mode of operation is selected.

31. A method, in a wireless receiver module of an animal behavior modification system, comprising:

receiving radio frequency (RF) signals;

down-converting the received RF signals to baseband frequency signals containing a formatted transmission message;

converting the baseband frequency signals from analog to a digital format to create a digitally formatted transmission message containing control signals;

determining if a receiver address within the digitally formatted transmission message containing control signals matches a stored address within the receiver address;

determining, by analyzing the digitally formatted transmission message containing control signals, that a no-bark mode of operation was selected;

detecting and determining that an animal has barked; and generating a stimulation.

32. The method of claim 31 wherein the step of determining that the animal has barked further includes determining if the barking exceeds a barking threshold.

33. The method of claim 32 further includes the step of generating the stimulation if the detected barking exceeds the barking threshold.

* * * * *